United States Patent
Stanley et al.

(10) Patent No.: US 10,865,708 B2
(45) Date of Patent: Dec. 15, 2020

(54) SYSTEMS AND METHODS FOR DETERMINING INDICATED MEAN EFFECTIVE PRESSURE

(71) Applicant: GM Global Technology Operations LLC, Detroit, MI (US)

(72) Inventors: Colby T. Stanley, Commerce Township, MI (US); Xiangkun Kong, Troy, MI (US); David S. Mathews, Howell, MI (US); Nicholas J. Kalweit, Novi, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 66 days.

(21) Appl. No.: 16/267,499

(22) Filed: Feb. 5, 2019

(65) Prior Publication Data

US 2020/0248618 A1   Aug. 6, 2020

(51) Int. Cl.
  *F02B 75/18* (2006.01)
  *F02D 41/00* (2006.01)
  *F02D 13/02* (2006.01)
  *F02D 31/00* (2006.01)

(52) U.S. Cl.
  CPC .......... *F02B 75/18* (2013.01); *F02D 13/0219* (2013.01); *F02D 31/007* (2013.01); *F02D 41/0087* (2013.01)

(58) Field of Classification Search
  CPC .......................... F02D 35/023; F02D 41/2451
  USPC ....................................................... 123/52.1
  See application file for complete search history.

(56) References Cited

U.S. PATENT DOCUMENTS

| | | | |
|---|---|---|---|
| 7,918,212 B2 | 4/2011 | Verdejo et al. | |
| 8,612,124 B2 | 12/2013 | Verdejo et al. | |
| 9,845,752 B2 | 12/2017 | Verdejo et al. | |
| 2005/0205069 A1* | 9/2005 | Lewis | F01L 13/0005 123/491 |
| 2010/0116249 A1* | 5/2010 | Guerrassi | F02D 41/40 123/435 |
| 2015/0275806 A1* | 10/2015 | Genslak | F02D 41/0002 701/104 |
| 2016/0363057 A1* | 12/2016 | Cygan, Jr. | F02D 13/0207 |
| 2017/0122246 A1* | 5/2017 | Ottikkutti | F02D 41/402 |
| 2017/0356362 A1* | 12/2017 | Macewen | F02D 41/009 |
| 2018/0135544 A1* | 5/2018 | Kalweit | F02D 41/0097 |
| 2018/0274473 A1* | 9/2018 | Levijoki | F02D 41/2409 |
| 2018/0274474 A1* | 9/2018 | Uphues | F02P 5/1504 |
| 2018/0298838 A1* | 10/2018 | Pisu | F02D 35/028 |

\* cited by examiner

*Primary Examiner* — Long T Tran
*Assistant Examiner* — James J Kim (57) ABSTRACT

An engine control system of a vehicle includes a cylinder control module configured to: determine a target sequence for at least activating and deactivating cylinders of an engine based on a torque request; and activate and deactivate the cylinders of the engine according to the target sequence. A values module is configured to determine, based on the target sequence, a plurality of coefficients and an offset value. An indicated mean effective pressure (IMEP) determination module is configured to determine an IMEP of a first cylinder based on: the plurality of coefficients; the offset value; and a plurality of engine speeds at a predetermined crankshaft positions, respectively.

20 Claims, 6 Drawing Sheets

SYSTEMS AND METHODS FOR DETERMINING INDICATED MEAN EFFECTIVE PRESSURE

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to internal combustion engines and more particularly to systems and methods for determining indicated mean effective pressure (IMEP).

Internal combustion engines combust an air and fuel mixture within cylinders to drive pistons, which produces drive torque. In some types of engines, air flow into the engine may be regulated via a throttle. The throttle may adjust throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders generally increases the torque output of the engine.

Under some circumstances, one or more cylinders of an engine may be deactivated. Deactivation of a cylinder may include deactivating opening and closing of intake and exhaust valves of the cylinder and halting fueling of the cylinder. One or more cylinders may be deactivated, for example, to decrease fuel consumption when the engine can produce a requested amount of torque while the one or more cylinders are deactivated.

SUMMARY

In a feature, an engine control system of a vehicle includes a cylinder control module configured to: determine a target sequence for at least activating and deactivating cylinders of an engine based on a torque request; and activate and deactivate the cylinders of the engine according to the target sequence. A values module is configured to determine, based on the target sequence, a plurality of coefficients and an offset value. An indicated mean effective pressure (IMEP) determination module is configured to determine an IMEP of a first cylinder based on: the plurality of coefficients; the offset value; and a plurality of engine speeds at a predetermined crankshaft positions, respectively.

In further features, the plurality of engine speeds include: a first engine speed at a first predetermined crankshaft position during an expansion stroke of the first cylinder; a second engine speed at a second predetermined crankshaft position during the expansion stroke of the first cylinder; a third engine speed at a third predetermined crankshaft position during a compression stroke of the first cylinder; a fourth engine speed at a fourth predetermined crankshaft position during the compression stroke of the first cylinder; a fifth engine speed at a fifth predetermined crankshaft position during an expansion stroke of a second cylinder that is before the first cylinder in a predetermined firing order of the engine; a sixth engine speed at a sixth predetermined crankshaft position during the expansion stroke of the second cylinder; a seventh engine speed at a seventh predetermined crankshaft position during a compression stroke of the second cylinder; an eighth engine speed at an eighth predetermined crankshaft position during the compression stroke of the second cylinder; a ninth engine speed at a ninth predetermined crankshaft position during an expansion stroke of a third cylinder that is after the first cylinder in the predetermined firing order of the engine; a tenth engine speed at a tenth predetermined crankshaft position during the expansion stroke of the third cylinder; an eleventh engine speed at an eleventh predetermined crankshaft position during a compression stroke of the third cylinder; and a twelfth engine speed at a twelfth predetermined crankshaft position during the compression stroke of the third cylinder.

In further features: the second cylinder is immediately before the first cylinder in the predetermined firing order; and the third cylinder is immediately after the first cylinder in the predetermined firing order.

In further features, a kinetic energy module is configured to: determine a first kinetic energy for an expansion stroke of the first cylinder based on: a first engine speed at a first predetermined crankshaft position during the expansion stroke of the first cylinder; and a second engine speed at a second predetermined crankshaft position during the expansion stroke of the first cylinder; determine a second kinetic energy for a compression stroke of the first cylinder based on: a third engine speed at a third predetermined crankshaft position during the compression stroke of the first cylinder; and a fourth engine speed at a fourth predetermined crankshaft position during the compression stroke of the first cylinder; determine a third kinetic energy for an expansion stroke of a second cylinder that is before the first cylinder in a predetermined firing order of the engine based on: a fifth engine speed at a fifth predetermined crankshaft position during the expansion stroke of the second cylinder; and a sixth engine speed at a sixth predetermined crankshaft position during the expansion stroke of the second cylinder; determine a fourth kinetic energy for a compression stroke of the second cylinder based on: a seventh engine speed at a seventh predetermined crankshaft position during the compression stroke of the second cylinder; and an eighth engine speed at an eighth predetermined crankshaft position during the compression stroke of the second cylinder; determine a fifth kinetic energy for an expansion stroke of a third cylinder that is after the first cylinder in the predetermined firing order based on: a ninth engine speed at a ninth predetermined crankshaft position during the expansion stroke of the third cylinder; and a tenth engine speed at a tenth predetermined crankshaft position during the expansion stroke of the third cylinder; and determine a sixth kinetic energy for a compression stroke of the third cylinder based on: an eleventh engine speed at an eleventh predetermined crankshaft position during the compression stroke of the third cylinder; and a twelfth engine speed at a twelfth predetermined crankshaft position during the compression stroke of the third cylinder. The IMEP module is configured to determine the IMEP of the first cylinder based on: the plurality of coefficients; the offset value; and the first, second, third, fourth, fifth, and sixth kinetic energies.

In further features, the IMEP module is configured to set the IMEP of the first cylinder using the equation:

$$IMEP1 = KE_{C2}*v + KE_{E2}*u + KE_{C1}*t + KE_{E1}*s + KE_{C3}*r + KE_{E3}*q + p,$$

where IMEP1 is the IMEP of the first cylinder, $KE_{E2}$ is the third kinetic energy, $KE_{C2}$ is the fourth kinetic energy, $KE_{E1}$ is the first kinetic energy, $KE_{C1}$ is the second kinetic energy, $KE_{E3}$ is the fifth kinetic energy, $KE_{C3}$ is the sixth kinetic energy, v, u, t, s, r, and q are the plurality of coefficients, and p is the offset value.

In further features, the values module is configured to determine the plurality of coefficients and the offset value further based on at least one of an engine speed and an engine load.

In further features, the kinetic energy module is configured to: determine the first kinetic energy based on a first difference between the first engine speed squared and the second engine speed squared; determine the second kinetic energy based on a second difference between the third engine speed squared and the fourth engine speed squared; determine the third kinetic energy based on a third difference between the fifth engine speed squared and the sixth engine speed squared; determine the fourth kinetic energy based on a fourth difference between the seventh engine speed squared and the eighth engine speed squared; determine the fifth kinetic energy based on a fifth difference between the ninth engine speed squared and the tenth engine speed squared; and determine the sixth kinetic energy based on a sixth difference between the eleventh engine speed squared and the twelfth engine speed squared.

In further features: the first predetermined crankshaft position is before the second predetermined crankshaft position; the third predetermined crankshaft position is before the fourth predetermined crankshaft position; the fifth predetermined crankshaft position is before the sixth predetermined crankshaft position; the seventh predetermined crankshaft position is before the eighth predetermined crankshaft position; the ninth predetermined crankshaft position is before the tenth predetermined crankshaft position; the eleventh predetermined crankshaft position is before the twelfth predetermined crankshaft position. The kinetic energy module is configured to: determine the first kinetic energy based on the second engine speed squared minus the first engine speed squared; determine the second kinetic energy based on the fourth engine speed squared minus the third engine speed squared; determine the third kinetic energy based on the sixth engine speed squared minus the fifth engine speed squared; determine the fourth kinetic energy based on the eighth engine speed squared minus the seventh engine speed squared; determine the fifth kinetic energy based on the tenth engine speed squared minus the ninth engine speed squared; and determine the sixth kinetic energy based on the twelfth engine speed squared minus the eleventh engine speed squared.

In further features, a misfire module is configured to indicate that a misfire occurred within the first cylinder when the first cylinder was activated and the IMEP is less than a predetermined value.

In further features, the misfire module is configured to indicate that a misfire did not occur within the first cylinder when the first cylinder was activated and the IMEP is greater than the predetermined value.

In further features, a spark control module is configured to adjust a spark timing of the first cylinder in response to the indication that a misfire occurred within the first cylinder.

In further features, a fault module is configured to illuminate a malfunction indicator light in response to the indication that a misfire occurred within the first cylinder.

In further features, the fault module is further configured to store a predetermined diagnostic trouble code (DTC) in memory in response to the indication that a misfire occurred within the first cylinder.

In further features, a fuel control module is configured to adjust fueling of the first cylinder in response to the indication that a misfire occurred within the first cylinder.

In further features, a throttle control module is configured to adjust opening of a throttle valve in response to the indication that a misfire occurred within the first cylinder.

In further features, a boost control module is configured to adjust an output of a boost device in response to the indication that a misfire occurred within the first cylinder.

In further features, a phaser control module is configured to adjust intake valve phasing in response to the indication that a misfire occurred within the first cylinder.

In further features, a spark control module is configured to adjust exhaust valve phasing in response to the indication that a misfire occurred within the first cylinder.

In further features: the second cylinder is immediately before the first cylinder in the predetermined firing order; and the third cylinder is immediately after the first cylinder in the predetermined firing order.

In a feature, an engine control method for a vehicle includes: determining a target sequence for at least activating and deactivating cylinders of an engine based on a torque request; activating and deactivating the cylinders of the engine according to the target sequence; determining, based on the target sequence, a plurality of coefficients and an offset value; and determining an IMEP of a first cylinder based on: the plurality of coefficients; the offset value; and a plurality of engine speeds at a predetermined crankshaft positions, respectively.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Internal combustion engines combust an air and fuel mixture within cylinders to generate torque. Under some circumstances, an engine control module (ECM) may deactivate one or more cylinders of the engine. The ECM may deactivate one or more cylinders, for example, to decrease fuel consumption.

The ECM determines a target firing fraction for the cylinders of the engine to achieve an engine torque request. A numerator of the target firing fraction may indicate how many cylinders to activate (Y) during the next X number of cylinders in a firing order of the cylinders, where X is the denominator of the target firing fraction. The ECM activates and deactivates cylinders to achieve the target firing fraction. More specifically, the ECM determines a target sequence for activating and deactivating cylinders to achieve the target firing fraction over the length of the target sequence.

The composition of the gas trapped within a cylinder varies depending on whether the cylinder is activated or deactivated. According to the present disclosure, the ECM determines an indicated mean effective pressure (IMEP) of a cylinder based on the target sequence used to activate and deactivate cylinders. Determining the IMEP based on the target sequence increases accuracy of the IMEP determination. Determining the IMEP based on the target sequence also provides better separation between the IMEP values of misfiring cylinders and the IMEPs of non-misfiring cylinders. This may help increase accuracy of diagnosing whether a cylinder misfired or not.

Figure 1:
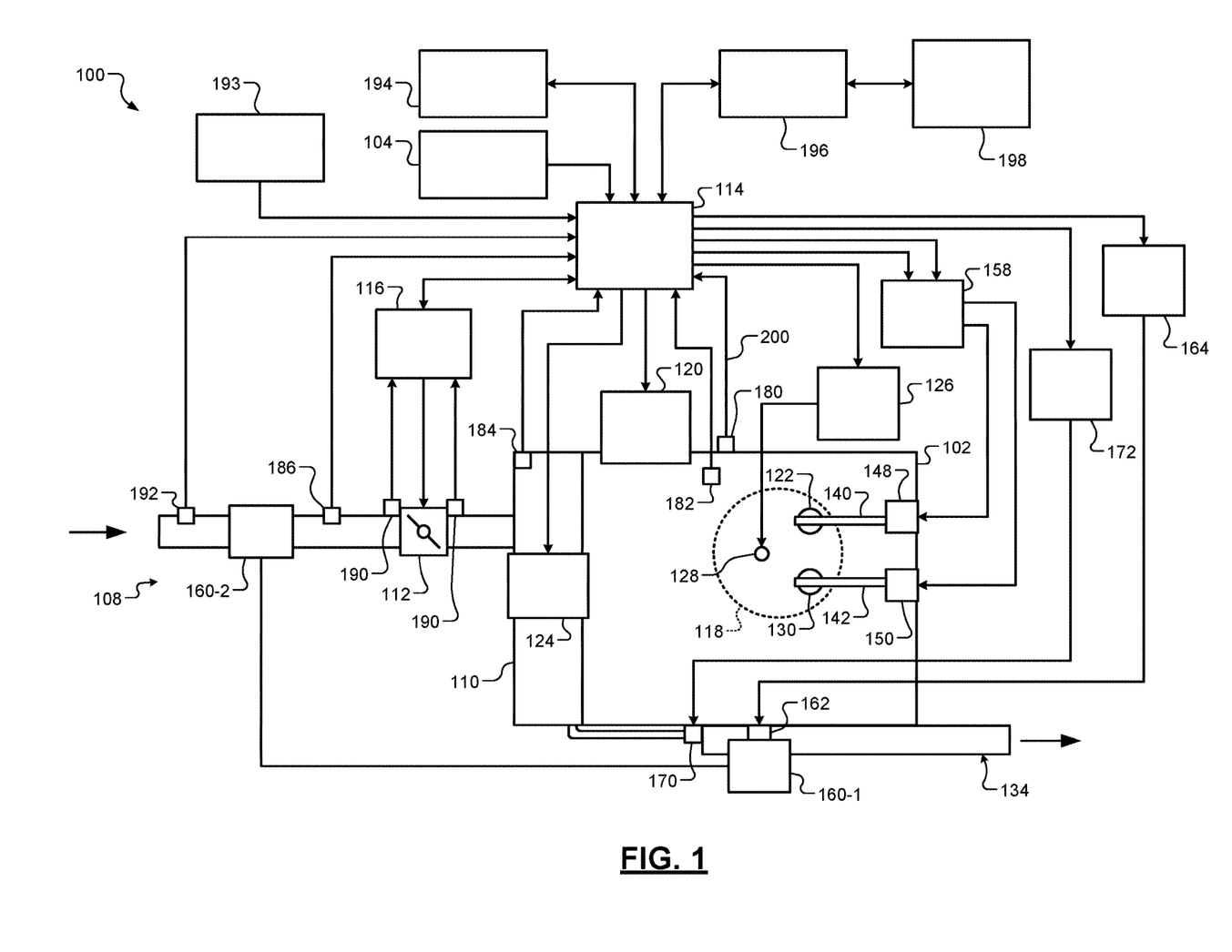
FIG. 1 is a functional block diagram of an example engine system.

Referring now to FIG. 1, a functional block diagram of an example engine system 100 is presented. The engine system 100 of a vehicle includes an engine 102 that combusts an air/fuel mixture to produce torque based on driver input from a driver input module 104. Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, as discussed further below, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine system 100 may include a boost device that provides pressurized air to the intake manifold 110. For example, FIG. 1 shows a turbocharger including a turbine 160-1 that is driven by exhaust gases flowing through the exhaust system 134. The turbocharger also includes a compressor 160-2 that is driven by the turbine 160-1 and that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. Although shown separated for purposes of illustration, the turbine 160-1 and the compressor 160-2 may be mechanically linked to each other, placing intake air in close proximity to hot exhaust. The compressed air charge may absorb heat from components of the exhaust system 134.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

Crankshaft position may be measured using a crankshaft position sensor 180. The crankshaft position sensor 180 monitors an N-toothed wheel that rotates with the crankshaft and generates a crankshaft position signal 200 based on rotation of the N-toothed wheel. For example only, the crankshaft position sensor 180 may include a variable reluctance (VR) sensor or another suitable type of crankshaft position sensor. The N-toothed wheel includes space for N equally spaced teeth.

The crankshaft position sensor 180 generates a pulse in the crankshaft position signal 200 each time when a tooth of the N-toothed wheel (e.g., rising or falling edge of the tooth) passes the crankshaft position sensor 180. Accordingly, each pulse in the crankshaft position signal 200 may correspond to an angular rotation of the crankshaft by an amount equal to 360° divided by N. For example only, the N-toothed wheel may include space for 60 equally spaced teeth (i.e., N=60), and each pulse in the crankshaft position signal 200 may therefore correspond to approximately 6° of crankshaft rotation. In various implementations, one or more of the N teeth may be omitted. For example only, two of the N teeth may be omitted in various implementations. An engine speed may be determined based on the crankshaft position measured using the crankshaft position sensor 180.

A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. The engine system 100 may also include one or more other sensors 193. The ECM 114 may use signals from the sensors to make control decisions for the engine system 100.

The ECM 114 may communicate with a transmission control module 194, for example, to coordinate shifting gears in a transmission. For example, the ECM 114 may reduce engine torque during a gear shift. The ECM 114 may communicate with a hybrid control module 196, for example, to coordinate operation of the engine 102 and an electric motor 198. The electric motor 198 may also function as a generator, and may be used to produce electrical energy for use by vehicle electrical systems and/or for storage in a battery. While only the electric motor 198 is shown and discussed, multiple electric motors may be implemented. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the boost actuator module 164, and the EGR actuator module 172. For these engine actuators, the actuator values may correspond to a cylinder activation/deactivation sequence, fueling rate, intake and exhaust cam phaser angles, boost pressure, and EGR valve opening area, respectively. The ECM 114 may control the actuator values in order to cause the engine 102 to generate a requested engine output torque.

Figure 2:
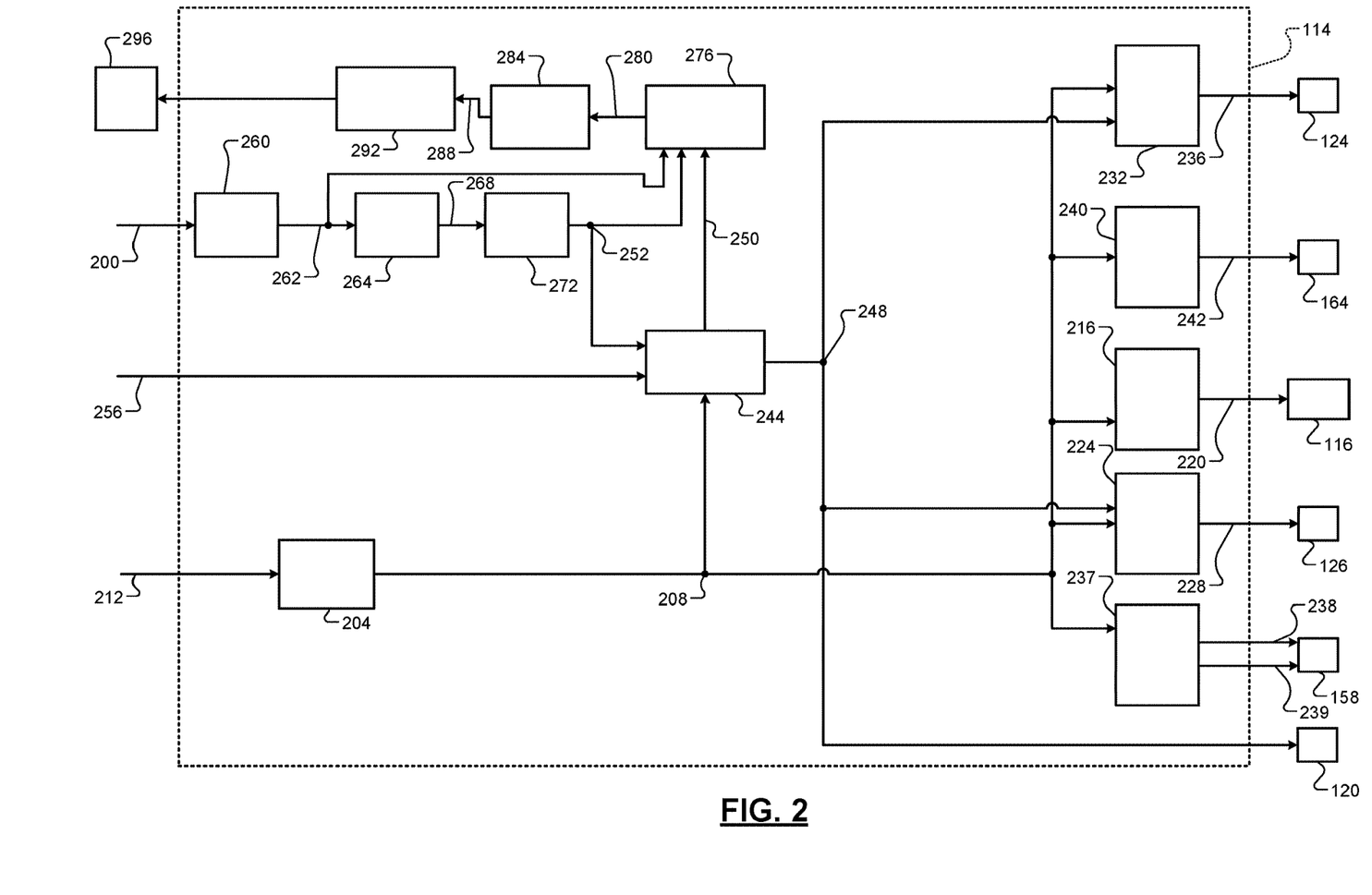
FIG. 2 is a functional block diagram of an example engine control system.

Referring now to FIG. 2, a functional block diagram of an example engine control system is presented. A torque request module 204 determines a torque request 208 for the engine 102 based on one or more driver inputs 212. The driver inputs 212 may include, for example, an accelerator pedal position, a brake pedal position, a cruise control input, and/or one or more other suitable driver inputs. The torque request module 204 may determine the torque request 208 additionally or alternatively based on one or more other torque requests, such as torque requests generated by the ECM 114 and/or torque requests received from other modules of the vehicle, such as the transmission control module 194, the hybrid control module 196, a chassis control module, etc.

One or more engine actuators are controlled based on the torque request 208 and/or one or more other parameters. For example, a throttle control module 216 may determine a target throttle opening 220 based on the torque request 208. The throttle actuator module 116 may adjust opening of the throttle valve 112 based on the target throttle opening 220.

A spark control module 224 determines a target spark timing 228 based on the torque request 208. The spark actuator module 126 generates spark based on the target spark timing 228. A fuel control module 232 determines one or more target fueling parameters 236 based on the torque request 208. For example, the target fueling parameters 236 may include fuel injection amount, number of fuel injections for injecting the amount, and timing for each of the injections. The fuel actuator module 124 injects fuel based on the target fueling parameters 236.

A phaser control module 237 determines target intake and exhaust cam phaser angles 238 and 239 based on the torque request 208. The phaser actuator module 158 may regulate the intake and exhaust cam phasers 148 and 150 based on the target intake and exhaust cam phaser angles 238 and 239, respectively. A boost control module 240 may determine a target boost 242 based on the torque request 208. The boost actuator module 164 may control boost output by the boost device(s) based on the target boost 242.

A cylinder control module 244 generates an activation/deactivation command 248 for a next cylinder in a predetermined firing order of the cylinders ("the next cylinder"). The activation/deactivation command 248 indicates whether the next cylinder should be activated or deactivated. For example only, the cylinder control module 244 may set the activation/deactivation command 248 to a first state (e.g., 1) when the next cylinder should be activated and set the activation/deactivation command 248 to a second state (e.g., 0) when the next cylinder should be deactivated. While the activation/deactivation command 248 is and will be discussed as being generated for the next cylinder in the predetermined firing order, the activation/deactivation command 248 may be generated for a second cylinder immediately following the next cylinder in the predetermined firing order, a third cylinder immediately following the second cylinder in the predetermined firing order, or another cylinder following the next cylinder in the predetermined firing order.

The cylinder actuator module 120 deactivates the intake and exhaust valves of the next cylinder when the activation/deactivation command 248 indicates that the next cylinder should be deactivated. The cylinder actuator module 120 allows opening and closing of the intake and exhaust valves of the next cylinder when the activation/deactivation command 248 indicates that the next cylinder should be activated.

The fuel control module 232 halts fueling of the next cylinder when the activation/deactivation command 248 indicates that the next cylinder should be deactivated. The fuel control module 232 sets the target fueling parameters 236 to provide fuel to the next cylinder when the activation/deactivation command 248 indicates that the next cylinder should be activated. The spark control module 224 may provide spark to the next cylinder when the activation/deactivation command 248 indicates that the next cylinder should be activated. The spark control module 224 may provide or halt spark to the next cylinder when the activation/deactivation command 248 indicates that the next cylinder should be deactivated. Cylinder deactivation is different than fuel cutoff (e.g., deceleration fuel cutoff) in that the intake and exhaust valves of cylinders to which fueling is halted during fuel cutoff may still be opened and closed during fuel cutoff whereas the intake and exhaust valves of cylinders are maintained closed when those cylinders are deactivated.

The cylinder control module 244 may generate the activation/deactivation command 248 based on a target firing sequence. The cylinder control module 244 may determine the target firing sequence to achieve a target firing fraction. A numerator of the target firing fraction corresponds to a target number of cylinders to be activated (M) out of the next N cylinders in the predetermined firing order of the cylinders, and N is the denominator of the target firing fraction. For example, a target firing fraction of 5/8 indicates that 5 of the next 8 cylinders in the predetermined firing order should be activated. In this example, 3 of the next 8 cylinders in the predetermined firing order should therefore be deactivated. A target firing fraction of 0 corresponds to all of the cylinders of the engine 102 being deactivated (and 0 being activated), and a target firing fraction of 1 corresponds to all of the cylinders of the engine 102 being activated (and 0 being deactivated).

The cylinder control module 244 may determine the target firing fraction based on the torque request 208, a filtered engine speed 252, and a current gear ratio 256 of the transmission. For example, the cylinder control module 244 may determine the target firing fraction using one of a function and a mapping that relates torque requests, engine speeds, and gear ratios to target firing fractions. The filtered engine speed 252 may be determined as discussed further below. The transmission control module 194 controls which gear ratio is engaged within the transmission and may provide the current gear ratio 256.

The cylinder control module 244 may select one of one or more possible sequences as the target firing sequence. The possible sequences include possible sequences for activating and deactivating cylinders to achieve the target firing fraction. The possible sequences for each possible value of the target firing fraction may be identified during calibration and stored, for example, in memory. The cylinder control module 244 determines the possible sequences stored for the target firing fraction.

Each of the possible sequences for a given target firing fraction includes a sequence of a plurality of entries for activating and deactivating cylinders to achieve that target firing fraction. For example, a possible sequence for achieving a target firing fraction of 5/8 may be

[1, 0, 1, 1, 0, 1, 0, 1], where a 1 indicates an activated cylinder and a 0 indicates a deactivated cylinder. Other possible sequences for achieving a target firing fraction of 5/8 include, but are not limited to:

[1, 1, 0, 1, 0, 1, 0, 1],
[1, 0, 0, 1, 1, 0, 1, 1], and
[0, 1, 1, 0, 1, 1, 0, 1].

Multiple possible sequences may be stored for each possible target firing fraction. Exceptions where only 1 possible sequence may be stored include target firing fractions of 0 and 1, where zero and all cylinders are activated. While the example of sequences of 8 cylinders are provided, longer or shorter sequences may be used. The cylinder control module 244 selects one of the possible sequences as the target firing sequence.

A position module 260 determines an (instantaneous) crankshaft position 262 based on the crankshaft position signal 200 and the distances between the teeth of the N-toothed wheel. For example, each time that a pulse is detected in the crankshaft position signal 200, the position module 260 may update the instantaneous crankshaft position by adding the rotational distance between the present tooth and the previous tooth to the previous value of the instantaneous crankshaft position. The rotational distances between teeth may be predetermined fixed values or may be learned.

An engine speed module 264 determines an (instantaneous) engine speed 268 based on the crankshaft position 262. For example, each time the crankshaft position 262 is updated, the engine speed module 264 may set the engine speed 268 based on or equal to the change in the crankshaft position 262 divided by the period between the present time and the last time that the crankshaft position 262 was updated. In other words, the engine speed module 264 may set the engine speed 268 based on or equal to a change in the crankshaft position 262 over time.

A filter module 272 applies a filter to the engine speed 268 to produce the filtered engine speed 252. The filter may be, for example, a Kalman based filter, a Chebyshev based filter, a Butterworth type II based filter, or another suitable type of filter.

The composition of gas within a cylinder varies depending on whether the cylinder is activated or deactivated. The composition of gas within the cylinders should be accounted for when indicated mean effective pressure (IMEP) of a cylinder is estimated.

According to the present disclosure, an IMEP module 276 determines the IMEP value 280 of a cylinder based on filtered engine speeds at predetermined crankshaft positions during the compression and expansion strokes of a last cylinder (in a predetermined firing order) before the cylinder, filtered engine speeds at predetermined crankshaft positions during the compression and expansion strokes of the cylinder, and filtered engine speed at predetermined crankshaft positions during the compression and expansion strokes of a next cylinder following the cylinder (in the predetermined firing order). The IMEP module 276 determines the IMEP value 280 of the cylinder further based on whether the cylinder, the last cylinder, and the next cylinder were activated or deactivated. This increases accuracy of the IMEP 280 and provides separation for accurate engine misfire detection. The IMEP module 276 determines IMEPs for the cylinders, respectively, as the crankshaft rotates.

Figure 3:
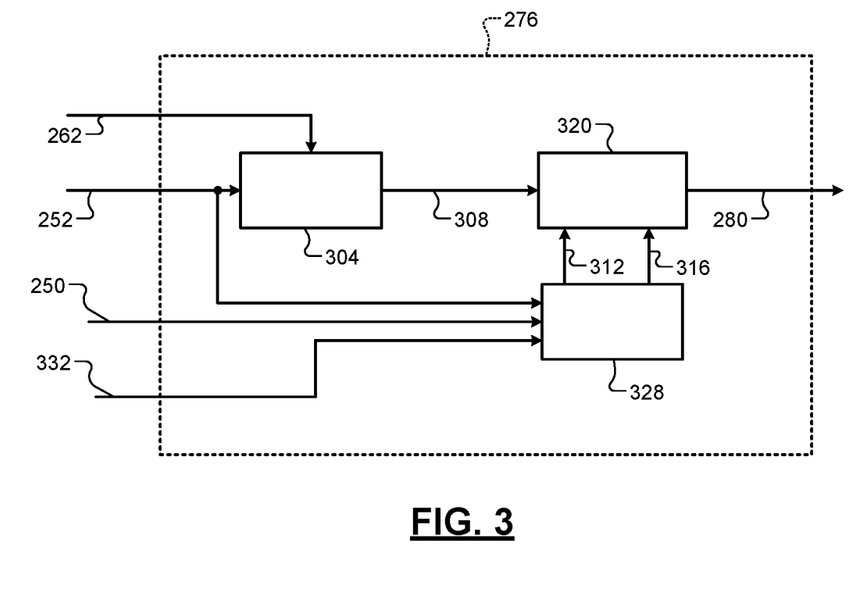
FIG. 3 is a functional block diagram of an example implementation of an indicated mean effective pressure (IMEP) module.

FIG. 3 is a functional block diagram of an example implementation of the IMEP module 276. A kinetic energy module 304 determines kinetic energy values 308 based on values of the filtered engine speed 252 at predetermined crankshaft positions. The kinetic energy module 304 monitors the crankshaft position 262 and uses the values of the filtered engine speed 252 when the crankshaft position 262 reaches the predetermined crankshaft positions, respectively.

The kinetic energy module 304 determines a kinetic energy value for each expansion stroke of each cylinder and a kinetic energy value for each compression stroke of each cylinder. The kinetic energy values 308 are proportional to kinetic energies and are converted to pressure via coefficients 312 which are discussed further below along with an offset value 316.

The kinetic energy module 304 determines the kinetic energy for the expansion stroke of a cylinder based on a first value ($\omega_S$) of the filtered engine speed 252 at a first predetermined crankshaft position during the expansion stroke of the cylinder and a second value ($\omega_E$) of the filtered engine speed 252 at a second predetermined crankshaft position during the expansion stroke of the cylinder. For example, the kinetic energy module 304 may set the kinetic energy for the expansion stroke of the cylinder using the equation:

$$KE_E = \omega_E^2 - \omega_S^2,$$

where $KE_E$ is the kinetic energy value for the expansion stroke of the cylinder, $\omega_E$ is the second value of the filtered engine speed 252 at the second predetermined crankshaft position, $\omega_S$ is the first value of the filtered engine speed 252 at the first predetermined crankshaft position. The second predetermined crankshaft position is after (later than) the first predetermined crankshaft position. The second predetermined crankshaft position is a second predetermined amount of crankshaft rotation after the beginning of the expansion stroke of the cylinder, and the first predetermined crankshaft position is a first predetermined amount of crankshaft rotation after the beginning of the expansion stroke of the cylinder. The second predetermined amount is greater than the first predetermined amount.

The kinetic energy module 304 determines the kinetic energy for the compression stroke of a cylinder based on a third value ($\omega_X$) of the filtered engine speed 252 at a third predetermined crankshaft position during the compression stroke of the cylinder and a fourth value ($\omega_Y$) of the filtered engine speed 252 at a fourth predetermined crankshaft position during the compression stroke of the cylinder. For example, the kinetic energy module 304 may set the kinetic energy for the compression stroke of the cylinder using the equation:

$$KE_C = \omega_Y^2 - \omega_X^2,$$

where $KE_C$ is the kinetic energy value for the compression stroke of the cylinder, $\omega_X$ is the third value of the filtered engine speed 252 at the third predetermined crankshaft position, $\omega_Y$ is the fourth value of the filtered engine speed 252 at the fourth predetermined crankshaft position. The fourth predetermined crankshaft position is after (later than) the third predetermined crankshaft position. The fourth predetermined crankshaft position is a fourth predetermined amount of crankshaft rotation after the beginning of the compression stroke of the cylinder, and the third predetermined crankshaft position is a third predetermined amount of crankshaft rotation after the beginning of the compression stroke of the cylinder. The fourth predetermined amount is greater than the third predetermined amount.

Figure 4:
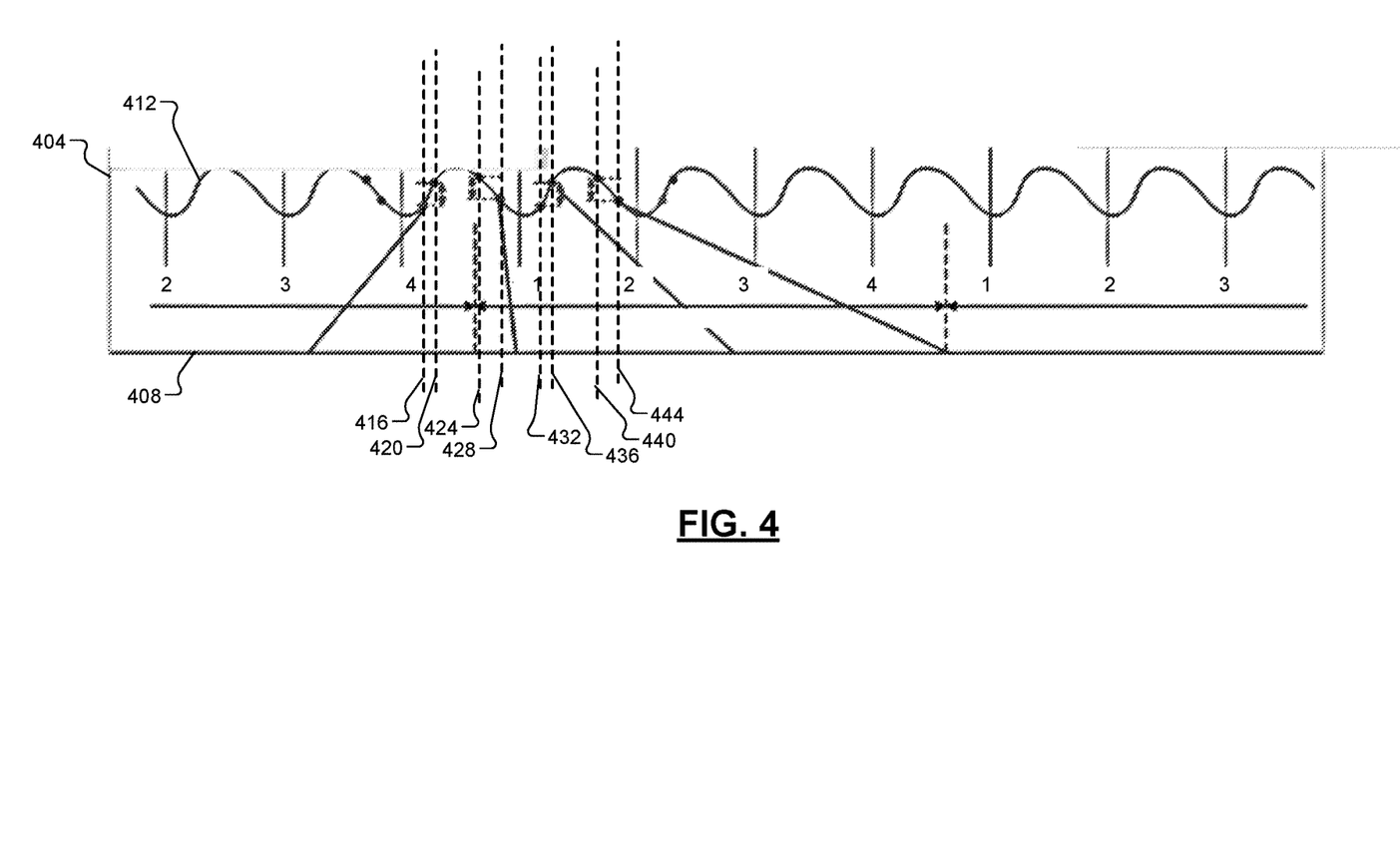
FIG. 4 is an example graph of filtered engine speed versus crankshaft position.

FIG. 4 illustrates an example graph of filtered engine speed 404 versus crankshaft position 408. Trace 412 tracks the filtered engine speed 252. 416 and 420 correspond to examples of the first and second predetermined crankshaft positions during the expansion stroke of a first cylinder in the predetermined firing order of the cylinders. 424 and 428 correspond to examples of the third and fourth predetermined crankshaft positions during the compression stroke of a second cylinder that is next in the predetermined firing order after the first cylinder.

432 and 436 correspond to examples of the first and second predetermined crankshaft positions during the expansion stroke of the second cylinder. 440 and 444 correspond to examples of the third and fourth predetermined crankshaft positions during the compression stroke of a third cylinder that is next in the predetermined firing order after the second cylinder.

Referring back to FIG. 3, an IMEP (indicated mean effective pressure) determination module 320 determines the IMEP value 280 for each cylinder. The IMEP determination module 320 determines the IMEP value 280 for a first cylinder based on the kinetic energy value 308 for the expansion stroke of the first cylinder, the kinetic energy value 308 for the compression stroke of the first cylinder, the kinetic energy value 308 for the compression stroke of a second cylinder that is immediately before the first cylinder in the predetermined firing order of the cylinders, the kinetic energy value 308 for the expansion stroke of the second cylinder, the kinetic energy value 308 for the expansion stroke of a third cylinder that is immediately after the first cylinder in the predetermined firing order, the kinetic energy value 308 for the compression stroke of the third cylinder, the coefficients 312, and the offset value 316. The IMEP determination module 320 determines the IMEP value 280 for cylinders using at least one of a lookup table and an equation that relates the KE values, coefficients, and offset values to IMEP values. For example, the IMEP determination module 320 may set the IMEP value 280 for the first cylinder using the equation:

$$IMEP1 = KE_{C2}*v + KE_{E2}*u + KE_{C1}*t + KE_{E1}*s + KE_{C3}*r + KE_{E3}*q + p,$$

where IMEP1 is the IMEP value 280 for the first cylinder, $KE_{E2}$ is the kinetic energy value 308 for the expansion stroke of the second cylinder (that is immediately before the first cylinder in the predetermined firing order), $KE_{C2}$ is the kinetic energy value 308 for the compression stroke of the second cylinder, $KE_{E1}$ is the kinetic energy value 308 for the expansion stroke of the first cylinder, $KE_{C1}$ is the kinetic energy value 308 for the compression stroke of the first cylinder, $KE_{E3}$ is the kinetic energy value 308 for the expansion stroke of the third second cylinder (that is immediately after the first cylinder in the predetermined firing order), $KE_{C3}$ is the kinetic energy value 308 for the compression stroke of the third cylinder, v, u, t, s, r, and q are the coefficients 312, and p is the offset value 316. The above equation can be re-written in matrix form as follows.

$$IMEP1 = [KE_{C2} KE_{E2} KE_{C1} KE_{E1} KE_{C3} KE_{E3} 1] \begin{bmatrix} v \\ u \\ t \\ s \\ r \\ q \\ p \end{bmatrix}$$

A values module 328 determines the coefficients 312 (values) and the offset value 316 based on the target firing sequence 250, the filtered engine speed 252, and an engine load 332. Determining the coefficients 312 and the offset value 316 based on the target firing sequence 250 ensures that the determination of the IMEP value 280 of a cylinder is based on whether the cylinders was activated or deactivated, whether the cylinder immediately before the cylinder in the predetermined firing order was activated or deactivated, and whether the cylinder immediately after the cylinder in the predetermined firing order was activated or deactivated.

The values module 328 determines the coefficients 312 and the offset value 316, for example, using a lookup table that relates target firing sequences, engine speeds, and engine loads to sets each including coefficients and an offset value. The engine load 332 may be determined (e.g., by an engine load module), for example, based on a ratio of a present MAF measured using the MAF sensor 186 to a maximum MAF of the engine 102.

Referring back to FIG. 2, a misfire module 284 indicates whether each activated cylinder has misfired based on the cylinders' IMEP values 280, respectively. The misfire module 284 may determine that an activated cylinder misfired, for example, when the IMEP value 280 of that activated cylinder is less than a predetermined value. The predetermined value is calibratable and may be greater than zero. The misfire module 284 may determine that an activated cylinder did not misfire when the IMEP value 280 of that activated cylinder is greater than the predetermined value.

The misfire module 284 indicates whether a cylinder misfired using a misfire signal 288. For example, the misfire module 284 may set the misfire signal 288 to a first state when the cylinder misfired. The misfire module 284 may set the misfire signal 288 to a second state when the cylinder did not misfire or was deactivated.

One or more remedial actions may be taken when one or more cylinders misfire. For example, the spark control module 224 may adjust the spark timing of a cylinder when the cylinder misfires. A fault module 292 may diagnose the presence of a misfire fault, for example, when at least X out of Y activated cylinders misfire, where X is an integer greater than zero and Y is an integer greater than zero and greater than or equal to X. The fault module 292 may store a predetermined diagnostic trouble code (DTC) in memory when the misfire fault is diagnosed. The fault module 292 may light a malfunction indicator light (MIL) 296 when the misfire fault is diagnosed.

One or more engine actuators may be adjusted based the IMEP values 280. For example, the fuel control module 232 may adjust fueling based on one or more of the IMEP values 280. The boost control module 240 may adjust boost based on one or more of the IMEP values 280. The throttle control module 216 may adjust opening of the throttle valve 112 based on one or more of the IMEP values 280. The spark control module 224 may adjust spark timing based on one or more of the IMEP values 280. The phaser control module 237 may adjust intake and/or exhaust valve phasing based on one or more of the IMEP values 280.

Figure 5:
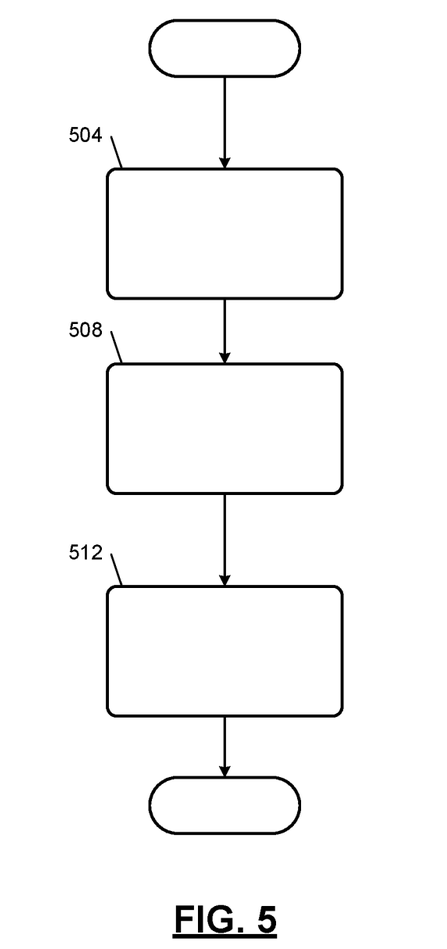
FIG. 5 is a flowchart depicting an example method of determining the IMEP of a cylinder.

FIG. 5 is a flowchart depicting an example method of determining the IMEP value 280 of a first cylinder. The kinetic energy module 304 determines the kinetic energy values 308 continuously as the crankshaft position 262 reaches the predetermined positions.

At 504, the IMEP determination module 320 obtains the kinetic energy value 308 for the expansion stroke of the second cylinder (that is immediately before the first cylinder in the predetermined firing order), the kinetic energy value 308 for the compression stroke of the second cylinder, the kinetic energy value 308 for the expansion stroke of the first cylinder, the kinetic energy value 308 for the compression stroke of the first cylinder, the kinetic energy value 308 for the expansion stroke of the third cylinder (that is immediately after the first cylinder in the predetermined firing order), and the kinetic energy value 308 for the compression stroke of the third cylinder.

At 508, the values module 328 determines the target firing sequence 250 that was used to control activation and deactivation of the first, second, and third cylinders. The values module 328 determines (collectively) the offset value 316 and the coefficients 312 based on the target firing sequence 250. In various implementations, indicators of whether the first, second, and third cylinders were activated or deactivated may be used in place of the target firing sequence 250.

At 512, the IMEP determination module 320 determines the IMEP of the first cylinder based on the kinetic energy value 308 for the expansion stroke of the second cylinder (that is immediately before the first cylinder in the predetermined firing order), the kinetic energy value 308 for the compression stroke of the second cylinder, the kinetic energy value 308 for the expansion stroke of the first cylinder, the kinetic energy value 308 for the compression stroke of the first cylinder, the kinetic energy value 308 for the expansion stroke of the third second cylinder (that is immediately after the first cylinder in the predetermined firing order), the kinetic energy value 308 for the compression stroke of the third cylinder, the coefficients 312, and offset value 316. For example, the IMEP determination module 320 may set the IMEP value 280 for the first cylinder using the equation:

$$IMEP1 = KE_{C2} * v + KE_{E2} * u + KE_{C1} * t + KE_{E1} * s + KE_{C3} * r + KE_{E3} * q + p, \text{ or}$$

$$IMEP1 = [KE_{C2} KE_{E2} KE_{C1} KE_{E1} KE_{C3} KE_{E3} 1] \begin{bmatrix} v \\ u \\ t \\ s \\ r \\ q \\ p \end{bmatrix},$$

where IMEP1 is the IMEP value 280 for the first cylinder, $KE_{E2}$ is the kinetic energy value 308 for the expansion stroke of the second cylinder (that is immediately before the first cylinder in the predetermined firing order), $KE_{C2}$ is the kinetic energy value 308 for the compression stroke of the second cylinder, $KE_{E1}$ is the kinetic energy value 308 for the expansion stroke of the first cylinder, $KE_{C1}$ is the kinetic energy value 308 for the compression stroke of the first cylinder, $KE_{E3}$ is the kinetic energy value 308 for the expansion stroke of a third cylinder (that is immediately after the first cylinder in the predetermined firing order), $KE_{C3}$ is the kinetic energy value 308 for the compression stroke of the third cylinder, v, u, t, s, r, and q are the coefficients 312, and p is the offset value 316.

While control is shown as ending after 512, control may return to 504 to determine the IMEP value 280 of the next cylinder in the predetermined firing order. In this example, the third cylinder is immediately after the first cylinder in the predetermined firing order.

Figure 6:
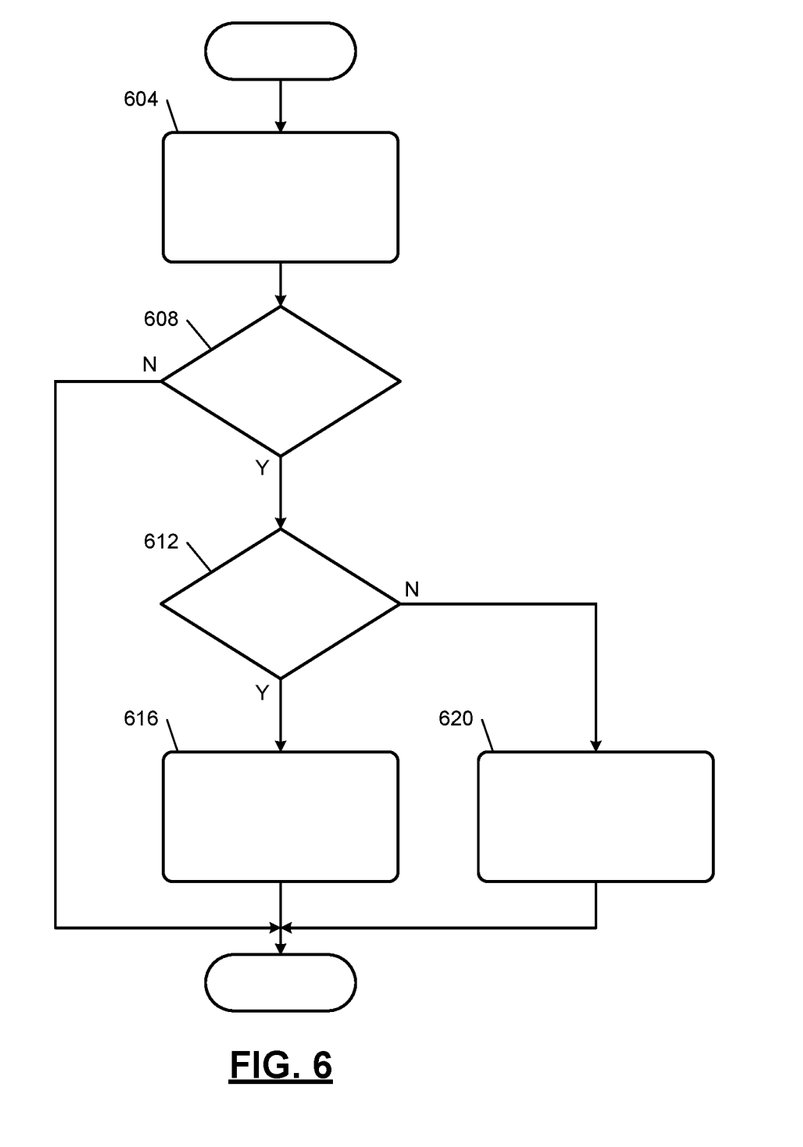
FIG. 6 is a flowchart depicting an example method of indicating whether a cylinder misfired.

FIG. 6 is a flowchart depicting an example method of indicating whether a cylinder misfired. Control begins with 604 where the misfire module 284 receives the IMEP value 280 of the cylinder, determined as described above. At 608, the misfire module 284 may determine whether the cylinder was activated. If 608 is false, control may end. Alternatively, control may continue with 616. If 608 is true, control continues with 612.

At 612, the misfire module determines whether the IMEP value 280 of the cylinder is greater than the predetermined value. If 612 is true, the misfire module 284 indicates that no misfire occurred within the cylinder at 616. If 612 is false, the misfire module 284 indicates that misfire occurred within the cylinder at 620. While control is shown as ending, control may return to 604 to determine and indicate whether misfire occurred within the next cylinder in the predetermined firing order.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An engine control system of a vehicle, comprising:
   a cylinder control module configured to:
      determine a target sequence for at least activating and deactivating the next N cylinders in a firing order of an engine based on a torque request,
         wherein N is an integer greater than or equal to two; and
      activate and deactivate the next N cylinders in the firing order of the engine according to the target sequence;
   a values module configured to determine a plurality of coefficients and an offset value based on the target sequence, an engine speed, and an engine load; and
   an indicated mean effective pressure (IMEP) determination module configured to determine an IMEP of a first cylinder based on:
      the plurality of coefficients;
      the offset value; and
      a plurality of engine speeds at a predetermined crankshaft positions, respectively.

2. The engine control system of claim 1 wherein the plurality of engine speeds include:
   a first engine speed at a first predetermined crankshaft position during an expansion stroke of the first cylinder;
   a second engine speed at a second predetermined crankshaft position during the expansion stroke of the first cylinder;
   a third engine speed at a third predetermined crankshaft position during a compression stroke of the first cylinder;
   a fourth engine speed at a fourth predetermined crankshaft position during the compression stroke of the first cylinder;
   a fifth engine speed at a fifth predetermined crankshaft position during an expansion stroke of a second cylinder that is before the first cylinder in a predetermined firing order of the engine;
   a sixth engine speed at a sixth predetermined crankshaft position during the expansion stroke of the second cylinder;
   a seventh engine speed at a seventh predetermined crankshaft position during a compression stroke of the second cylinder;
   an eighth engine speed at an eighth predetermined crankshaft position during the compression stroke of the second cylinder;
   a ninth engine speed at a ninth predetermined crankshaft position during an expansion stroke of a third cylinder that is after the first cylinder in the predetermined firing order of the engine;
   a tenth engine speed at a tenth predetermined crankshaft position during the expansion stroke of the third cylinder;
   an eleventh engine speed at an eleventh predetermined crankshaft position during a compression stroke of the third cylinder; and
   a twelfth engine speed at a twelfth predetermined crankshaft position during the compression stroke of the third cylinder.

3. The engine control system of claim 2 wherein:
   the second cylinder is immediately before the first cylinder in the predetermined firing order; and
   the third cylinder is immediately after the first cylinder in the predetermined firing order.

4. The engine control system of claim 1 further comprising a kinetic energy module configured to:
   determine a first kinetic energy for an expansion stroke of the first cylinder based on:
      a first engine speed at a first predetermined crankshaft position during the expansion stroke of the first cylinder; and
      a second engine speed at a second predetermined crankshaft position during the expansion stroke of the first cylinder;

determine a second kinetic energy for a compression stroke of the first cylinder based on:
a third engine speed at a third predetermined crankshaft position during the compression stroke of the first cylinder; and
a fourth engine speed at a fourth predetermined crankshaft position during the compression stroke of the first cylinder;
determine a third kinetic energy for an expansion stroke of a second cylinder that is before the first cylinder in a predetermined firing order of the engine based on:
a fifth engine speed at a fifth predetermined crankshaft position during the expansion stroke of the second cylinder; and
a sixth engine speed at a sixth predetermined crankshaft position during the expansion stroke of the second cylinder;
determine a fourth kinetic energy for a compression stroke of the second cylinder based on:
a seventh engine speed at a seventh predetermined crankshaft position during the compression stroke of the second cylinder; and
an eighth engine speed at an eighth predetermined crankshaft position during the compression stroke of the second cylinder;
determine a fifth kinetic energy for an expansion stroke of a third cylinder that is after the first cylinder in the predetermined firing order based on:
a ninth engine speed at a ninth predetermined crankshaft position during the expansion stroke of the third cylinder; and
a tenth engine speed at a tenth predetermined crankshaft position during the expansion stroke of the third cylinder; and
determine a sixth kinetic energy for a compression stroke of the third cylinder based on:
an eleventh engine speed at an eleventh predetermined crankshaft position during the compression stroke of the third cylinder; and
a twelfth engine speed at a twelfth predetermined crankshaft position during the compression stroke of the third cylinder,
wherein the IMEP module is configured to determine the IMEP of the first cylinder based on:
the plurality of coefficients;
the offset value; and
the first, second, third, fourth, fifth, and sixth kinetic energies.

5. The engine control system of claim 4 wherein the IMEP module is configured to set the IMEP of the first cylinder using the equation:

$$IMEP1 = KE_{C2}*v + KE_{E2}*u + KE_{C1}*t + KE_{E1}*s + KE_{C3}*r + KE_{E3}*q + p,$$

where IMEP1 is the IMEP of the first cylinder, $KE_{E2}$ is the third kinetic energy, $KE_{C2}$ is the fourth kinetic energy, $KE_{E1}$ is the first kinetic energy, $KE_{C1}$ is the second kinetic energy, $KE_{E3}$ is the fifth kinetic energy, $KE_{C3}$ is the sixth kinetic energy, v, u, t, s, r, and q are the plurality of coefficients, and p is the offset value.

6. The engine control system of claim 4 wherein the kinetic energy module is configured to:
determine the first kinetic energy based on a first difference between the first engine speed squared and the second engine speed squared;
determine the second kinetic energy based on a second difference between the third engine speed squared and the fourth engine speed squared;
determine the third kinetic energy based on a third difference between the fifth engine speed squared and the sixth engine speed squared;
determine the fourth kinetic energy based on a fourth difference between the seventh engine speed squared and the eighth engine speed squared;
determine the fifth kinetic energy based on a fifth difference between the ninth engine speed squared and the tenth engine speed squared; and
determine the sixth kinetic energy based on a sixth difference between the eleventh engine speed squared and the twelfth engine speed squared.

7. The engine control system of claim 4 wherein:
the first predetermined crankshaft position is before the second predetermined crankshaft position;
the third predetermined crankshaft position is before the fourth predetermined crankshaft position;
the fifth predetermined crankshaft position is before the sixth predetermined crankshaft position;
the seventh predetermined crankshaft position is before the eighth predetermined crankshaft position;
the ninth predetermined crankshaft position is before the tenth predetermined crankshaft position;
the eleventh predetermined crankshaft position is before the twelfth predetermined crankshaft position; and
the kinetic energy module is configured to:
determine the first kinetic energy based on the second engine speed squared minus the first engine speed squared;
determine the second kinetic energy based on the fourth engine speed squared minus the third engine speed squared;
determine the third kinetic energy based on the sixth engine speed squared minus the fifth engine speed squared;
determine the fourth kinetic energy based on the eighth engine speed squared minus the seventh engine speed squared;
determine the fifth kinetic energy based on the tenth engine speed squared minus the ninth engine speed squared; and
determine the sixth kinetic energy based on the twelfth engine speed squared minus the eleventh engine speed squared.

8. The engine control system of claim 4 further comprising a misfire module configured to indicate that a misfire occurred within the first cylinder when the first cylinder was activated and the IMEP is less than a predetermined value.

9. The engine control system of claim 8 wherein the misfire module is configured to indicate that a misfire did not occur within the first cylinder when the first cylinder was activated and the IMEP is greater than the predetermined value.

10. The engine control system of claim 8 further comprising a spark control module configured to adjust a spark timing of the first cylinder in response to the indication that a misfire occurred within the first cylinder.

11. The engine control system of claim 8 further comprising a fault module configured to illuminate a malfunction indicator light in response to the indication that a misfire occurred within the first cylinder.

12. The engine control system of claim 11 wherein the fault module is further configured to store a predetermined diagnostic trouble code (DTC) in memory in response to the indication that a misfire occurred within the first cylinder.

13. The engine control system of claim 8 further comprising a fuel control module configured to adjust fueling of the first cylinder in response to the indication that a misfire occurred within the first cylinder.

14. The engine control system of claim 8 further comprising a throttle control module configured to adjust opening of a throttle valve in response to the indication that a misfire occurred within the first cylinder.

15. The engine control system of claim 8 further comprising a boost control module configured to adjust an output of a boost device in response to the indication that a misfire occurred within the first cylinder.

16. The engine control system of claim 8 further comprising a phaser control module configured to adjust intake valve phasing in response to the indication that a misfire occurred within the first cylinder.

17. The engine control system of claim 8 further comprising a spark control module configured to adjust exhaust valve phasing in response to the indication that a misfire occurred within the first cylinder.

18. The engine control system of claim 4 wherein:
the second cylinder is immediately before the first cylinder in the predetermined firing order; and
the third cylinder is immediately after the first cylinder in the predetermined firing order.

19. An engine control method for a vehicle, comprising:
determining a target sequence for at least activating and deactivating the next N cylinders in a firing order of an engine based on a torque request,
wherein N is an integer greater than or equal to two;
activating and deactivating the next N cylinders in the firing order of the engine according to the target sequence;
determining a plurality of coefficients and an offset value based on the target sequence, an engine speed, and an engine load; and
determining an IMEP of a first cylinder based on:
the plurality of coefficients;
the offset value; and
a plurality of engine speeds at a predetermined crankshaft positions, respectively.

20. An engine control system of a vehicle, comprising:
a cylinder control module configured to:
determine a target sequence for at least activating and deactivating cylinders of an engine based on a torque request; and
activate and deactivate the cylinders of the engine according to the target sequence;
a values module configured to determine, based on the target sequence a plurality of coefficients and an offset value;
an indicated mean effective pressure (IMEP) determination module configured to determine an IMEP of a first cylinder based on:
the plurality of coefficients;
the offset value; and
a plurality of engine speeds at a predetermined crankshaft positions, respectively; and a kinetic energy module configured to:
determine a first kinetic energy for an expansion stroke of the first cylinder based on:
a first engine speed at a first predetermined crankshaft position during the expansion stroke of the first cylinder; and
a second engine speed at a second predetermined crankshaft position during the expansion stroke of the first cylinder;
determine a second kinetic energy for a compression stroke of the first cylinder based on:
a third engine speed at a third predetermined crankshaft position during the compression stroke of the first cylinder; and
a fourth engine speed at a fourth predetermined crankshaft position during the compression stroke of the first cylinder;
determine a third kinetic energy for an expansion stroke of a second cylinder that is before the first cylinder in a predetermined firing order of the engine based on:
a fifth engine speed at a fifth predetermined crankshaft position during the expansion stroke of the second cylinder; and
a sixth engine speed at a sixth predetermined crankshaft position during the expansion stroke of the second cylinder;
determine a fourth kinetic energy for a compression stroke of the second cylinder based on:
a seventh engine speed at a seventh predetermined crankshaft position during the compression stroke of the second cylinder; and
an eighth engine speed at an eighth predetermined crankshaft position during the compression stroke of the second cylinder;
determine a fifth kinetic energy for an expansion stroke of a third cylinder that is after the first cylinder in the predetermined firing order based on:
a ninth engine speed at a ninth predetermined crankshaft position during the expansion stroke of the third cylinder; and
a tenth engine speed at a tenth predetermined crankshaft position during the expansion stroke of the third cylinder; and
determine a sixth kinetic energy for a compression stroke of the third cylinder based on:
an eleventh engine speed at an eleventh predetermined crankshaft position during the compression stroke of the third cylinder; and
a twelfth engine speed at a twelfth predetermined crankshaft position during the compression stroke of the third cylinder,
wherein the IMEP module is configured to determine the IMEP of the first cylinder based on:
the plurality of coefficients;
the offset value; and
the first, second, third, fourth, fifth, and sixth kinetic energies.

* * * * *